(12) United States Patent
Hong et al.

(10) Patent No.: US 11,238,404 B2
(45) Date of Patent: Feb. 1, 2022

(54) ELECTRONIC APPARATUS AND OPERATION METHOD THEREOF

(71) Applicant: Coupang Corp., Seoul (KR)

(72) Inventors: Sun Young Hong, Seoul (KR); Sang Min Jun, Seoul (KR); So Hee Kim, Seoul (KR); Myung Soo Song, Seoul (KR); Se Hwan Chung, Seoul (KR)

(73) Assignee: Coupang Corp., Seoul (KR)

( * ) Notice: Subject to any disclaimer, the term of this patent is extended or adjusted under 35 U.S.C. 154(b) by 0 days.

(21) Appl. No.: 17/009,658

(22) Filed: Sep. 1, 2020

(65) Prior Publication Data

US 2021/0256459 A1    Aug. 19, 2021

(30) Foreign Application Priority Data

Feb. 17, 2020 (KR) .................. 10-2020-0019089

(51) Int. Cl.
*G06Q 10/08* (2012.01)
*G06F 3/0484* (2013.01)
*G06K 7/14* (2006.01)
*G06Q 10/00* (2012.01)

(52) U.S. Cl.
CPC ....... *G06Q 10/087* (2013.01); *G06F 3/04842* (2013.01); *G06K 7/1413* (2013.01); *G06Q 10/30* (2013.01)

(58) Field of Classification Search
CPC ........... G06Q 10/087; G06Q 10/06315; G06Q 10/30; G06K 7/1413; G06F 3/04842
USPC ........................................................ 705/28
See application file for complete search history.

(56) References Cited

U.S. PATENT DOCUMENTS

| 8,447,665 B1* | 5/2013 | Schoenharl | G06Q 10/087 |
| | | | 705/28 |
| 2003/0004750 A1 | 1/2003 | Teraoka et al. | |
| 2003/0023493 A1* | 1/2003 | Ohashi | G06Q 20/20 |
| | | | 705/16 |
| 2004/0195308 A1* | 10/2004 | Wagner | B65F 1/1638 |
| | | | 235/375 |
| 2004/0195309 A1* | 10/2004 | Wagner | B07C 7/005 |
| | | | 235/375 |
| 2004/0199401 A1* | 10/2004 | Wagner | G06Q 10/30 |
| | | | 235/385 |
| 2008/0040246 A1 | 2/2008 | Fukamachi | |

(Continued)

FOREIGN PATENT DOCUMENTS

| CN | 101014517 A | 8/2007 |
| CN | 104221035 A | 12/2014 |
| CN | 108492016 A | 9/2018 |

(Continued)

OTHER PUBLICATIONS

International Search Report dated Nov. 11, 2020, issued in corresponding PCT/KR2020/009553.

(Continued)

*Primary Examiner* — Russell S Glass
(74) *Attorney, Agent, or Firm* — Knobbe, Martens, Olson & Bear, LLP

(57) ABSTRACT

Provided is a method and apparatus for recognizing a disposal type of an item based on attribute information of the item, and updating information regarding stock based on processing information for the item, which is involved when the item is processed according to the disposal type.

13 Claims, 15 Drawing Sheets

(56) References Cited

U.S. PATENT DOCUMENTS

2020/0104788 A1\* 4/2020 Shuldman ............ G06Q 10/087

FOREIGN PATENT DOCUMENTS

| CN | 110291547 A | 9/2019 |
|---|---|---|
| CN | 110796406 A | 2/2020 |
| CN | 109064086 B | 5/2021 |
| JP | H03278173 | 12/1991 |
| JP | 2002-352322 A | 12/2002 |
| JP | 2003-016528 A | 1/2003 |
| JP | 2003-044662 A | 2/2003 |
| JP | 2009-123164 A | 6/2009 |
| JP | 2011-076385 A | 4/2011 |
| JP | 2013-037503 A | 2/2013 |
| JP | 2016-143266 A | 8/2016 |
| JP | 2017-65909 A | 4/2017 |
| JP | 2018-097475 A | 6/2018 |
| JP | 6633234 B | 1/2020 |
| KR | 10-2015-0089795 A | 8/2015 |
| KR | 10-1669760 B1 | 10/2016 |
| KR | 10-2017-0053424 A | 5/2017 |
| WO | WO 2013/134409 A1 | 9/2013 |
| WO | WO 2018/148644 A1 | 8/2018 |
| WO | WO 2020/202003 A1 | 10/2020 |

OTHER PUBLICATIONS

Kazuyuki Ishikawa, "Knowledge" and "Technology" of Logistics Systems Learned by Engineers, Jun. 20, 2018 pp. 90-113.

\* cited by examiner

| Tote barcode 1302 | Quantity 1304 | Operator 1306 | Quantity in discard zone 1308 | Quantity in problem zone 1310 | Quantity to redisplay 1312 | Completed date 1314 |
|---|---|---|---|---|---|---|
| 14-RCRTO-9-4 | 1 | 90758453 | 1 | 0 | 0 | 2020-01-17 13:34:02 |
| 14-RCRTO-39-376 | 2 | 90758453 | 2 | 0 | 0 | 2020-01-17 15:07:12 |
| 14-RCRTO-38-370 | 6 | 90758453 | 6 | 0 | 0 | 2020-01-17 15:15:42 |
| 14-RCRTO-9-728 | 5 | 90758453 | 5 | 0 | 0 | 2020-01-17 15:12:45 |
| 14-RCRTO-4-151 | 7 | 90758453 | 7 | 0 | 0 | 2020-01-17 13:44:27 |
| 14-RCRTO-11-440 | 12 | 90758453 | 12 | 0 | 0 | 2020-01-17 13:39:00 |
| 14-RCRTO-97-170 | 8 | 90758453 | 8 | 0 | 0 | 2020-01-17 15:28:41 |
| 14-RCRTO-14-821 | 5 | 90758453 | 5 | 0 | 0 | 2020-01-17 15:26:26 |
| 14-RCRTO-97-728 | 4 | 50409528 | 4 | 0 | 0 | 2020-01-17 13:48:03 |

ELECTRONIC APPARATUS AND OPERATION METHOD THEREOF

BACKGROUND

Technical Field

The present disclosure relates to an electronic apparatus for stock management and an operation method thereof.

Description of the Related Art

In order to be delivered to customers in accordance with orders, numerous items may be stored in a fulfillment center as stock. Positions of the items may be changed due to stock transfer or the number of items may be changed due to disposal, such as discard or liquidation, of items, and therefore, there is need for more accurate and efficient stock management.

SUMMARY

Technical Goals

An aspect provides an electronic apparatus and an operation method thereof. Technical goals to be achieved through the example embodiments are not limited to the technical goals as described above, and other technical tasks can be inferred from the following example embodiments.

Technical Solutions

According to a first embodiment, there is provided an operation method of an electronic apparatus for stock management, the method including recognizing attribute information of an item classified as a disposal target, recognizing a disposal type of the item based on the attribute information of the item, acquiring processing information for the item, which is involved when the item is processed according to the disposal type, and updating information on or regarding stock based on the processing information for the item.

According to a second embodiment, there is provided an operation method of a terminal for stock management, the method including acquiring identification information of an item classified as a disposal target, recognizing information on a disposal type of the item, which corresponds to the identification information of the item, acquiring processing information for the item, which is involved when the item is processed according to the disposal type, and providing the processing information for the item.

According to a third embodiment, there is provided an electronic apparatus for stock management, the apparatus including a memory configured to store at least one instruction, and a processor configured to execute the at least one instruction to perform the following operations: recognizing attribute information of an item classified as a disposal target, recognizing the disposal type of the item based on attribute information of the item, acquiring processing information for the item, which is involved when the item is processed according to the disposal type, and updating information on stock based on the processing information for the item.

According to a fourth embodiment, there is provided a non-transitory computer-readable recording medium having recorded thereon a program, which, when executed by a computer, implements the aforementioned method.

Specific details of other embodiments are included in the detailed description and drawings.

Effects

According to the present disclosure, the electronic apparatus determines a disposal type of an item based on an attribute information of the item, and updates information on or regarding stock using processing information for the item, which results from processing the item according to the disposal type, thereby enabled to implement a system for more accurately and more efficiently disposing an item.

Effects are not limited to the aforementioned effects, and other effects not mentioned will be clearly understood by those skilled in the art from the description of the claims.

BRIEF DESCRIPTION OF THE DRAWINGS

FIG. 13 illustrates an embodiment in which an electronic apparatus displays information on stock.

DETAILED DESCRIPTION

Terms used in embodiments are selected among common terms that are currently widely used in consideration of their functions in the present disclosure. However, the terms may be different according to an intention of one of ordinary skill in the art, a precedent, or the advent of new technology. Also, in particular cases, the terms are discretionally selected by the applicant of the present disclosure, and the meaning of those terms will be described in detail in the corresponding part of the detailed description. Therefore, the terms used in the present disclosure are not merely designations of the terms, but the terms are defined based on the meaning of the terms and content throughout the present disclosure.

Throughout the specification, when a part is said to "include" a certain component, which means that it may further include other components, except to exclude other components unless otherwise stated. In addition, terms such as " . . . unit", " . . . module", or the like refer to units that perform at least one function or operation, and the units may be implemented as hardware or software or as a combination of hardware and software.

Throughout the specification, the expression "at least one of A, B, and C" may include the following meanings: A alone; B alone; C alone; both A and B together; both A and C together; both B and C together; and all three of A, B, and C together.

The term "terminal" mentioned below may be implemented as a computer or mobile terminal capable of accessing a server or another terminal over a network. The computer includes, for example, a laptop equipped with a web browser, a desktop, a laptop, and the like, and the mobile terminal is, for example, wireless communication device assuring portability and mobility and may include any type of handheld-based wireless communication devices like communication-based terminals, which is based on International Mobile Telecommunication (IMT), Code Division Multiple Access (CDMA), W-Code Division Multiple Access (W-CDMA), Long Term Evolution (LTE), smart phones, tablet PCs, and the like.

Hereinafter, embodiments of the present disclosure will be described in detail with reference to the accompanying drawings so that those skilled in the art can easily implement the present disclosure. However, the present disclosure may be implemented in various different forms but it is not limited to the exemplary embodiments described hereinafter.

Hereinafter, embodiments of the present disclosure will be described in detail with reference to the drawings.

Figure 1:
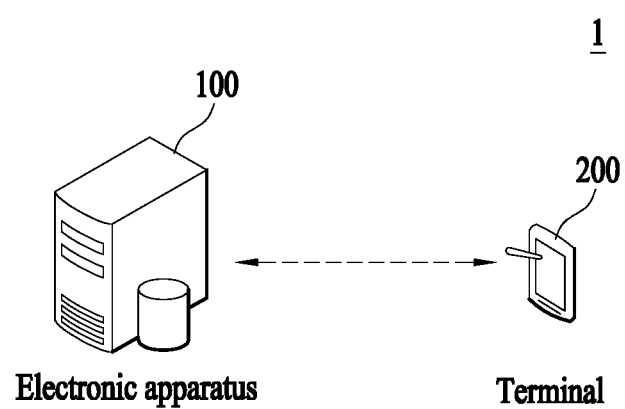
FIG. 1 illustrates a system for stock management according to an embodiment.

FIG. 1 illustrates a system for stock management according to an embodiment.

Referring to FIG. 1, a system 1 for stock management may include an electronic apparatus 100 and a terminal 200. The system 1 in FIG. 1 shows components related to the present embodiment. Accordingly, it would be understood by one of ordinary skill in the art that general-purpose components other than the components shown in FIG. 1 may be further included.

The electronic apparatus 100 and the terminal 200 may communicate with each other within a network. The network may include a Local Area Network (LAN), a Wide Area Network (WAN), a Value Added Network (VAN), a mobile radio communication network, a satellite communication network, and a combination thereof, and the network is, in a broad sense, a data network via which components of each network illustrated in FIG. 1 actively communicate with each other and may include wired Internet, wireless Internet, and a mobile wireless communication network. Wireless communication may include, for example, but not limited to, wireless LAN (Wi-Fi), Bluetooth, Bluetooth low energy (Bluetooth low energy), Zigbee, WFD (Wi-Fi Direct), UWB (ultra wideband), infrared communication (IrDA, infrared data association)), NFC (Near Field Communication), and the like.

The electronic apparatus 100 may manage stock of a fulfillment center. Specifically, items to be delivered to customers when orders are placed may be stored in the fulfillment center as the stock, and the electronic apparatus 100 may store information on or regarding the stock in a database. For example, the electronic apparatus 100 may store information on a position, a status, or a quantity of each item in the database. Also, the electronic apparatus 100 may monitor the information on the stock and update the information on the stock based on a change in the stock. For example, when a position of an item is changed due to a stock transfer, or when a quantity of the item is changed due to discard of the item, the electronic apparatus 100 may update the information on the stock. The electronic apparatus 100 may be included in a warehouse management system.

The electronic apparatus 100 may transmit a task instruction associated with the stock to the terminal 200. For example, the electronic apparatus 100 may transmit, to the terminal 200, a task instruction for relocation of an item, a task instruction for removal of an item, or a task instruction for disposal of an item. Also, the electronic apparatus 100 may receive a task result from the terminal 200 and update the information regarding the stock based on the task result. The terminal 200 may be a terminal carried by an operator.

The electronic apparatus 100 may recognize a disposal type of an item, and may transmit to the terminal 200 a task instruction for processing the item according to the disposal type. For example, based on attribute information of an item, the electronic apparatus 100 may recognize the item as a target to be liquidated or a target to be discarded and may transmit to the terminal 200 a task instruction for liquidation or discard of the item. In addition, the electronic apparatus 100 may receive processing information for the item, which indicates how the item is to be processed according to a disposal type, from the terminal 200 and may update information on the stock based on the processing information.

The electronic apparatus 100 may provide a platform for a stock management service. Specifically, the electronic apparatus 100 may provide an application for the stock management service to the terminal 200, and the electronic apparatus 100 may execute the application to provide the stock management service to the terminal 200 connected to the electronic apparatus 100. For example, the electronic apparatus 100 may be included in a server that provides the stock management service.

Figure 2:
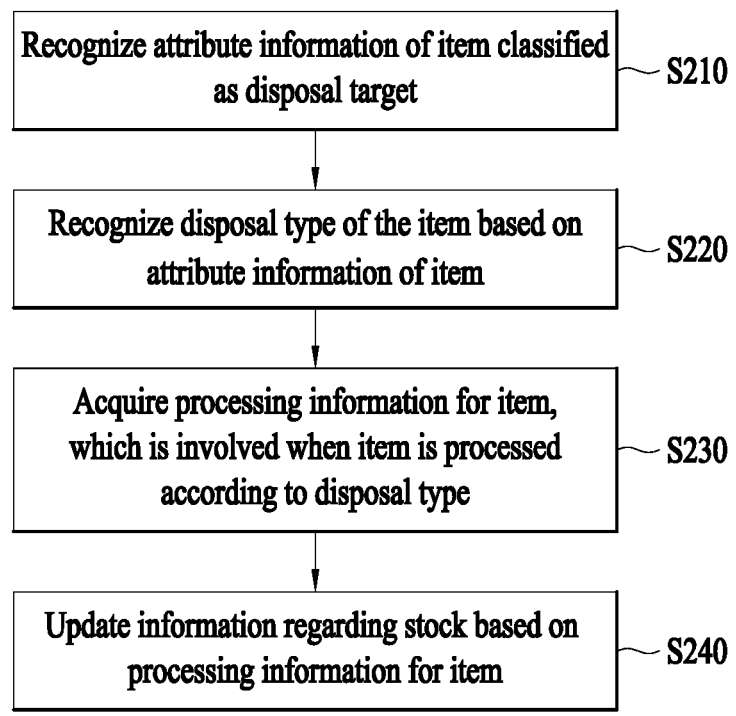
FIG. 2 illustrates an embodiment of an operation method of an electronic apparatus.

FIG. 2 illustrates an embodiment of an operation method of an electronic apparatus.

In operation S210, the electronic apparatus 100 may recognize attribute information of an item classified as a disposal target.

The item may be classified as the disposal target and may be stored in a storage unit. The storage unit may include one or more of physical shelving, bookshelves, boxes, totes, refrigerators, freezers, cold stores, or the like. According to an example, an operator may identify an item of which an expiration date has passed or is imminent and may classify the identified item as a disposal target and transfer the item to an arbitrary tote. According to another example, an operator may identify a damaged item, classify the damaged item as a disposal target, and transfer the damaged item to an arbitrary tote.

The electronic apparatus 100 may recognize attribute information of the item based on identification information of the item. According to an embodiment, the electronic apparatus 100 may receive the identification information of the item from an external terminal, and recognize the attribute information of the item based on the identification information. For example, the electronic apparatus 100 may recognize the attribute information of the item based on Stock Keeping Unit (SKU) ID of the item.

The attribute information of the item may include at least one of management type information, expiration date-related information, freshness-related information, and damage-related information of the item. The management type information of the item may include information as to whether the item is an item managed by or based on expiration date or an item managed by manufacture date. The expiration date-related information of the item may include information on or regarding the expiration date or the manufacture date of the item. The freshness-related information of the item may include information as to whether the item is an item managed by freshness. For example, the item may be an item managed by freshness, such as vegetable and fresh meat. The damage-related information of the item may include information as to whether the item is damaged, or information on a degree of damage to the item.

In the present disclosure, an item may indicate a single item, or may indicate a set of items of the same type. Also, an item may indicate a predetermined quantity of items corresponding to the same stock keeping unit (SKU). For example, an item having a specific SKU ID may indicate a predetermined quantity of items.

In operation S220, the electronic apparatus 100 may recognize a disposal type of the item based on the attribute information of the item recognized in operation S210. The disposal type of the item may include at least one of liquidation, discard, self-consumption, repacking, and redisplay.

The electronic apparatus 100 may recognize the item as a target to be liquidated based on the attribute information of the item. The liquidation may refer to transmitting, to a liquidator, an item that cannot be normally sold to a customer. For example, through the liquidation, the item may be sold to the liquidator at a price lower than a list price of the item. The electronic apparatus 100 may recognize the item as a target to be liquidated based on freshness-related information of the item. For example, when the item is an item managed by freshness, the electronic apparatus 100 may recognize the item as a target to be liquidated. The electronic apparatus 100 may recognize the item as a target to be liquidated based on damage-related information of the item. When a degree of damage to the item is low, the electronic apparatus 100 may recognize the item as a target to be liquidated.

The electronic apparatus 100 may recognize the item as a target to be discarded based on the attribute information of the item. The electronic apparatus 100 may recognize the item as a target to be discarded based on management type information of the item and expiration date-related information of the item. According to an example, when the item is an item managed by or based on expiration date and the expiration date of the item is within a predetermined period from a current date, the electronic apparatus 100 may recognize the item as a target to be discarded. When the item corresponds to a preset type of item, the electronic apparatus 100 may recognize the item as a target to be discarded. For example, when the item corresponds to at least one of diapers, powdered milk, and wipes, the electronic apparatus 100 may recognize the item as a target to be discarded. Information on the preset type of item may be updated. The electronic apparatus 100 may recognize the item as a target to be discarded based on damage-related information of the item. For example, when the item is completely damaged, the electronic apparatus 100 may recognize the item as a target to be discarded.

The electronic apparatus 100 may recognize the item as a target to be repacked based on the attribute information of the item. The electronic apparatus 100 may recognize the item as a target to be repacked based on the damage-related information of the item. For example, when a degree of damage to the item is low, the electronic apparatus 100 may recognize the item as a target to be repacked.

The electronic apparatus 100 may recognize the item as a target of self-consumption based on the attribute information of the item. The self-consumption may refer to consuming the item within the fulfillment center without selling the same. When the item corresponds to a preset type of item, the electronic apparatus 100 may recognize the item as a target of self-consumption.

The electronic apparatus 100 may recognize the item as a target to be redisplayed based on the attribute information of the item. Redisplay may refer to relocating an item, which has been misclassified as a disposal target, back to a storage space for delivery. For example, according to a process of redisplay, the item may be transferred from a discard zone to a picking zone. The electronic apparatus 100 may recognize the item as a target to be redisplayed based on expiration date-related information of the item.

The electronic apparatus 100 may recognize a disposal type of the item based on a user's input. In other words, the disposal type of the item may be determined by the user. In one example, the electronic apparatus 100 may recognize the item as a target to be liquidated based on an operator's input. In another example, the electronic apparatus 100 may recognize the item as a target to be redisplayed based on an operator's input. In yet another example, the electronic apparatus 100 may recognize the item as a target to be repacked based on an operator's input. In yet another example, the electronic apparatus 100 may recognize the item as a target of self-consumption based on an operator's input.

In operation S230, the electronic apparatus 100 may acquire processing information for the item, which is involved when the item is processed according to the disposal type recognized in operation S220. The processing information for the item includes at least one of the following: information on a quantity of the item to be transferred to a second storage unit where the item is to be processed according to the disposal type among a total quantity of the item pre-stored in a first storage unit; information on an expiration date for the quantity of the item to be transferred to the second storage unit; image information for the quantity of the item to be transferred to the second storage unit; and identification information of the second storage unit. The identification information of the second storage unit may include barcode information affixed to the second storage unit.

According to an embodiment of the present disclosure, the electronic apparatus 100 may transmit information on the disposal type of the item to the terminal, and acquire the processing information for the item from the terminal. Specifically, an operator may process the item according to the disposal type of the item and may input processing information for the item, which is a result of processing the item, to the terminal. Also, the processing information for the item input to the terminal may be transmitted to the electronic apparatus 100.

When the disposal type of the item is recognized as discard, the electronic apparatus 100 may acquire the information on a quantity of the item to be transferred to the second storage unit for discard among the total quantity of the item pre-stored in the first storage unit and the identification information of the second storage unit. In addition, the electronic apparatus 100 may further acquire the image information for the quantity of the item to be transferred from the first storage unit to the second storage unit. For example, when there are three items to be transferred from the first storage unit to the second storage unit, the electronic apparatus 100 may acquire image information for each of the three items.

When the electronic apparatus 100 recognizes that the disposal type of the item as redisplay, the electronic apparatus 100 may acquire the information on a quantity of the item to be transferred to the second storage unit for redisplay among the total quantity of the items pre-stored in the first storage unit and the identification information of the second storage unit. In addition, the electronic apparatus 100 may further acquire expiration date-related information for the quantity of the item to be transferred from the first storage unit to the second storage unit. When the quantity of the item is one, the expiration date-related information for the quantity of the item may include an expiration date or a manufacture date of one item. When the quantity of the item is plural and the item is an item managed by expiration date, the expiration date-related information for the quantity of the item may include the earliest expiration date among expiration dates of a plurality of items. Likewise, when the quantity of the item is plural and the item is an item managed by manufacture date, the expiration date-related information for the quantity of the item may include the earliest manufacture date among manufacture dates of a plurality of items.

When the electronic apparatus 100 recognizes the disposal type of the item as repacking, information on a quantity of the item to be transferred to the second storage unit for repacking among the total quantity of the item pre-stored in the first storage unit and the identification information of the second storage unit.

When the disposal type of the item is recognized as self-consumption, the electronic apparatus 100 may acquire information on a quantity of the item to be transferred to the second storage unit for self-consumption among the total quantity of the item pre-stored in the first storage unit and the identification information of the second storage unit.

When the disposal type of the item is recognized as liquidation, the electronic apparatus 100 may acquire information on a quantity of the item to be transferred to the second storage unit for liquidation among the total quantity of the items pre-stored in the first storage unit and the identification information of the second storage unit.

In operation S240, the electronic apparatus 100 may update the information on the stock based on the processing information for the item. In other words, based on the processing information for the item, the electronic apparatus 100 may update the information on the stock based on the processing information for the item, which is a result of processing the item according to the disposal type. Specifically, the electronic apparatus 100 may update a disposed status of the item in the stock based on the processing information for the item. For example, when a first quantity of the item is a target to be discarded, the electronic apparatus 100 may update, based on the processing information for the item, information on a second quantity of the item transferred to a storage unit for discard among the first quantity of the item.

The electronic apparatus 100 may update information regarding a quantity-on-system of the disposal target based on the processing information for the item. For example, the electronic apparatus 100 may determine, based on the processing information for the item, whether the quantity-on-system of the item to be disposed matches an actual quantity of the item, and if the quantity-on-system of the item does not match the actual quantity of the item, the quantity-on-system of the item may be adjusted to the actual quantity of the item.

Based on the processing information for the item, the electronic apparatus 100 may update the expiration date-related information of the item to be redisplayed. For example, based on the expiration date-related information for the first quantity of the item to be transferred to the storage unit for redisplay, the electronic apparatus 100 may update License Plate Number (LPN) information of the first quantity of the item to be redisplayed.

The electronic apparatus 100 may provide the processing information for the item. For example, the electronic apparatus 100 may display the processing information for the item through a display.

Accordingly, the electronic apparatus 100 may determine the disposal type of the item based on the attribute information of the item and may update the information on the stock using the processing information for the item, which is involved when the item is processed according to the disposal type, and therefore, a system for more accurate and efficient item disposal may be implemented.

In addition, since the electronic apparatus 100 acquires processing information for or of an item each disposal of the item, it is possible to more easily identify a disposal history of the item. For example, when an item is deducted from the stock due to disposal, the electronic apparatus 100 may more easily track a disposal type of the item and a disposal quantity of the item using the processing information for the item.

Figure 3:
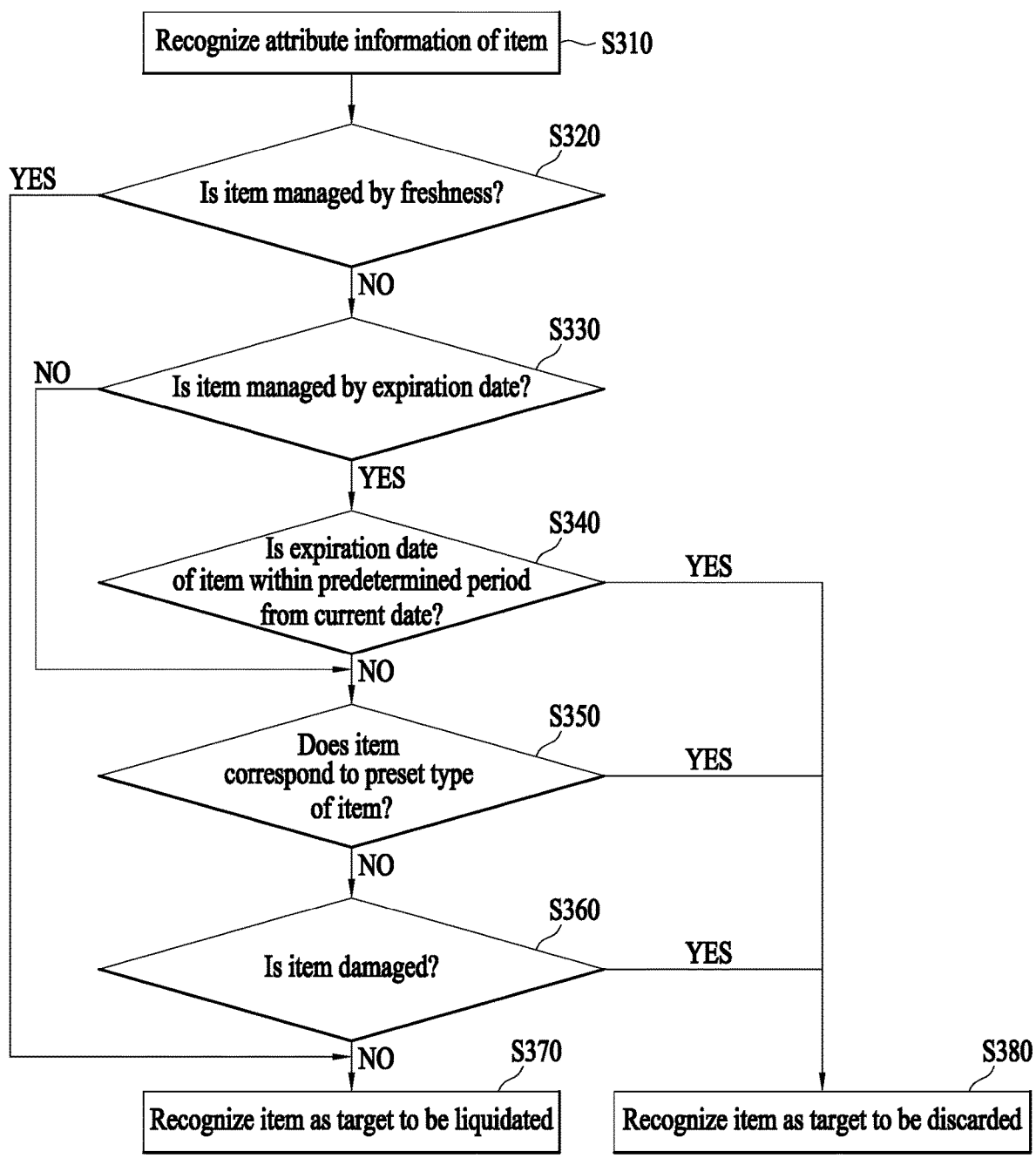
FIG. 3 illustrates an embodiment in which an electronic apparatus recognizes a disposal type of an item.

FIG. 3 illustrates an embodiment in which an electronic apparatus recognizes a disposal type of an item.

In operation S310, an electronic apparatus 100 may recognize attribute information of an item. The electronic apparatus 100 may recognize the attribute information of the item based on identification information of the item.

In operation S320, the electronic apparatus 100 may determine, based on the attribute information of the item, whether the item is an item managed by freshness. In other words, the electronic apparatus 100 may determine, based on freshness-related information of the item, whether the item is an item managed by freshness. For example, an item received at a specific fulfillment center may be designated as an item managed by freshness, and thus, if an item is identified as an item to be processed at the specific fulfillment center, the electronic apparatus 100 may recognize the item as an item managed by freshness.

When it is determined in operation S320 that the item is an item managed by freshness, the electronic apparatus 100 may recognize the item as a target to be liquidated in operation S370.

When it is determined in operation S320 that the item is not an item managed by freshness, the electronic apparatus 100 may determine, based on attribute information of the item, whether the item is an item managed by expiration date in operation S330. In other words, the electronic apparatus 100 may determine, based on management type information of the item, whether the item is an item managed by expiration date or an item managed by manufacture date. When the item is an item managed by expiration date, the item may be managed based on an expiration date and a shelf life. When the item is an item managed by manufacture date, the item may be managed based on a manufacture date and a shelf life.

When it is determined in operation S330 that the item is an item managed by or based on expiration date, the electronic apparatus 100 may determine whether the expiration date of the item is within a predetermined period from a current date in operation S340. For example, the electronic apparatus 100 may determine whether the expiration date of the item is within 15 days from the current date.

When it is determined in operation S340 that the expiration date of the item is within the predetermined period from the current date, the electronic apparatus 100 may recognize the item as a target to be discarded in operation S380.

When it is determined in operation S330 that the item is not an item managed by expiration date or when it is determined in operation S340 that the expiration date of the item is not within the predetermined period from the current date, the electronic apparatus 100 may determine, based on the attribute information of the item, whether the item corresponds to a preset type of item in operation S350. For example, the electronic apparatus 100 may determine whether the item corresponds to a Private Label (PL) item.

When it is determined in operation S350 that the item corresponds to the preset type of item, the electronic apparatus 100 may recognize the item as a target to be discarded in operation S380.

When it is determined in operation S350 that the item does not correspond to the preset type of item, the electronic apparatus 100 may determine, based on the attribute information of the item, whether the item is a damaged item in operation S360. According to an embodiment, the electronic apparatus 100 may determine, based on the attribute information of the item, whether the item is a damaged item. According to another embodiment, the electronic apparatus 100 may determine, based on an operator's input, whether the item is a damaged item. For example, the electronic apparatus 100 may acquire information as to whether the item is damaged, which is confirmed by the operator with bare eyes.

When it is determined in operation S360 that the item is a damaged item, the electronic apparatus 100 may recognize the item as a target to be discarded in operation S380. When it is determined in operation S360 that the item is not a damaged item, the electronic apparatus 100 may recognize the item as a target to be liquidated in operation S370.

Figure 4:
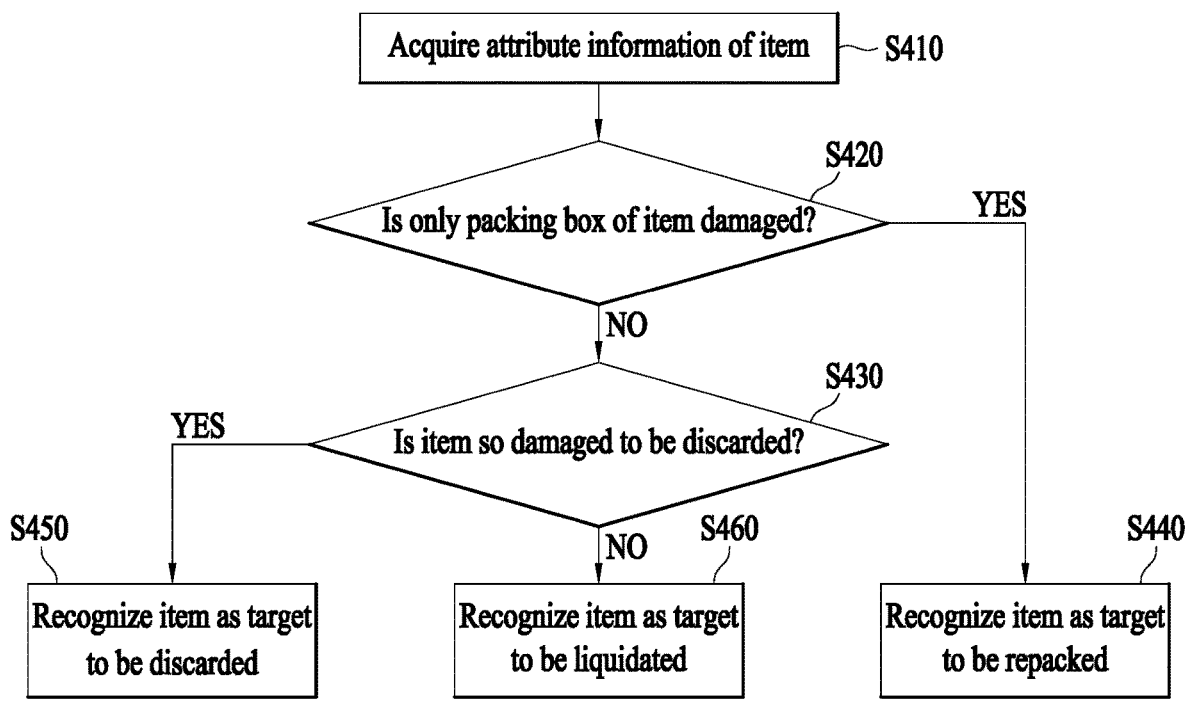
FIG. 4 illustrates another embodiment in which an electronic apparatus recognizes a disposal type of an item.

FIG. 4 illustrates another embodiment in which an electronic apparatus recognizes a disposal type of an item.

In operation S410, an electronic apparatus 100 may recognize attribute information of an item. The electronic apparatus 100 may recognize the attribute information of the item based on identification information of the item.

In operation S420, the electronic apparatus 100 may determine whether only a packing box of the item is damaged. According to an embodiment, the electronic apparatus 100 may determine whether only the packing box of the item is damaged, based on the attribute information of the item. According to another embodiment, the electronic apparatus 100 may determine whether only the packing box of the item is damaged, based on an operator's input. For example, the operator may input information on a degree of damage to the item, which is confirmed with bare eyes, to a terminal, and the electronic apparatus 100 may determine whether only the packing box of the item is damaged, based on the information acquired from the terminal.

When it is determined in operation S420 that only the packing box of the item is damaged, the electronic apparatus 100 may recognize the item as a target to be repacked in operation S440.

When it is determined in operation S420 that the packing box of the item is not the only one damaged, the electronic apparatus 100 may determine whether the item is too damaged and should be discarded in operation S430. According to an embodiment, the electronic apparatus 100 may determine whether the item is so damaged to be discarded, based on the attribute information of the item. According to another embodiment, the electronic apparatus 100 may determine whether the item is so damaged to be discarded, based on an operator's input. For example, the operator may input information on a degree of damage to the item, which is confirmed with bare eyes, to the terminal, and the electronic apparatus 100 may determine whether the item is so damaged to be discarded, based on the information acquired from the terminal.

When it is determined in operation S430 that the item is so damaged to be discarded, the electronic apparatus 100 may recognize the item as a target to be discarded in operation S450.

When it is determined in operation S430 that the item is not so damaged to be discarded, the electronic apparatus 100 may recognize the item as a target to be liquidated in operation S460.

According to an embodiment, the electronic apparatus 100 may recognize the item as a target of self-consumption, based on the attribute information of the item. According to another embodiment, the electronic apparatus 100 may recognize the item as a target of self-consumption, based on an operator's input.

Figure 5:
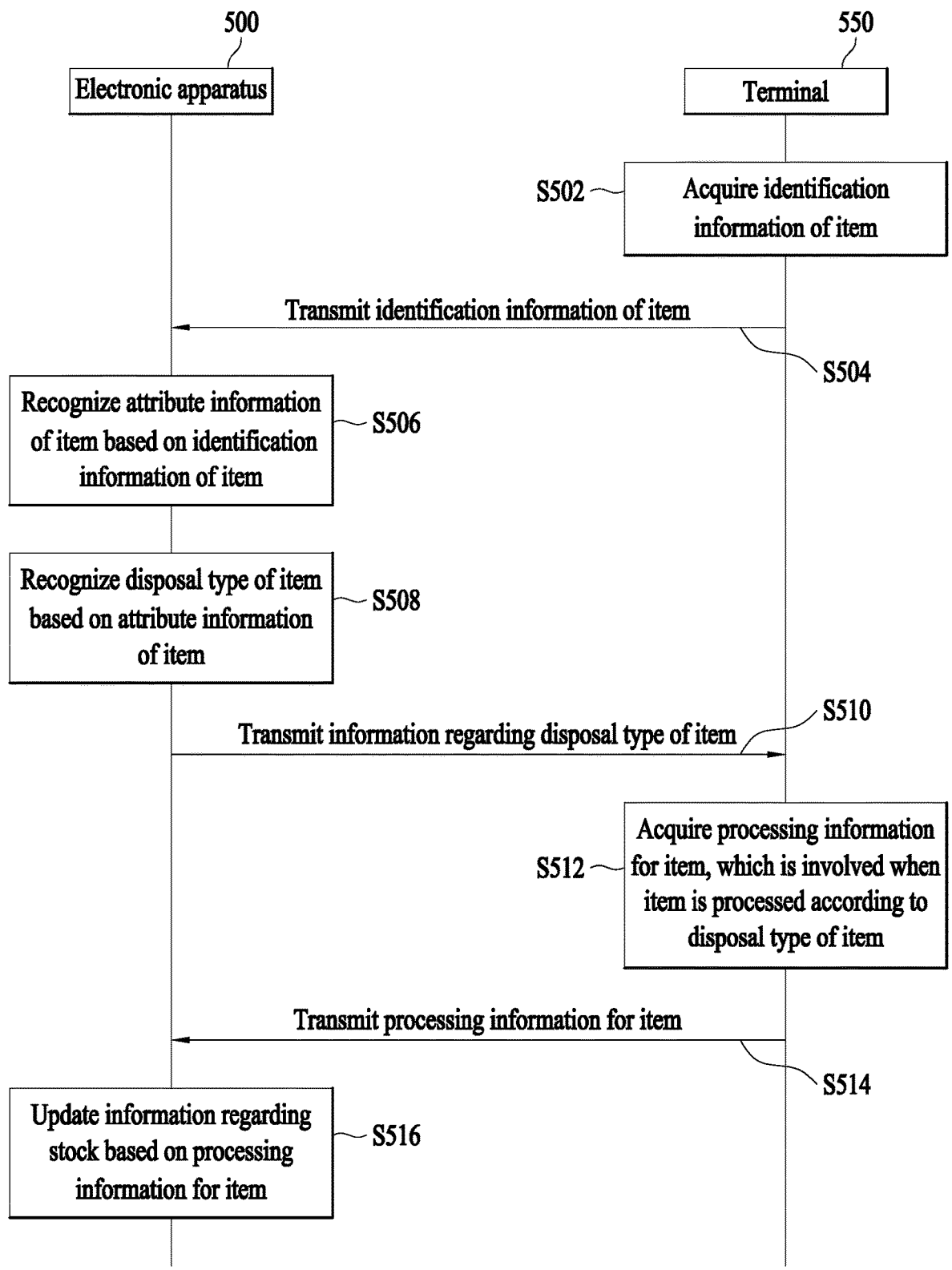
FIG. 5 illustrates an embodiment in which an electronic apparatus and a terminal operate.

FIG. 5 illustrates an embodiment in which an electronic apparatus and a terminal operate.

In operation S502, a terminal 550 may acquire identification information of an item classified as a disposal target. Specifically, an operator may identify an item classified as a disposal target in a storage unit and may scan a barcode of the identified item through the terminal 550. As a result, the terminal 550 may acquire the identification information of the item.

Figure 6:
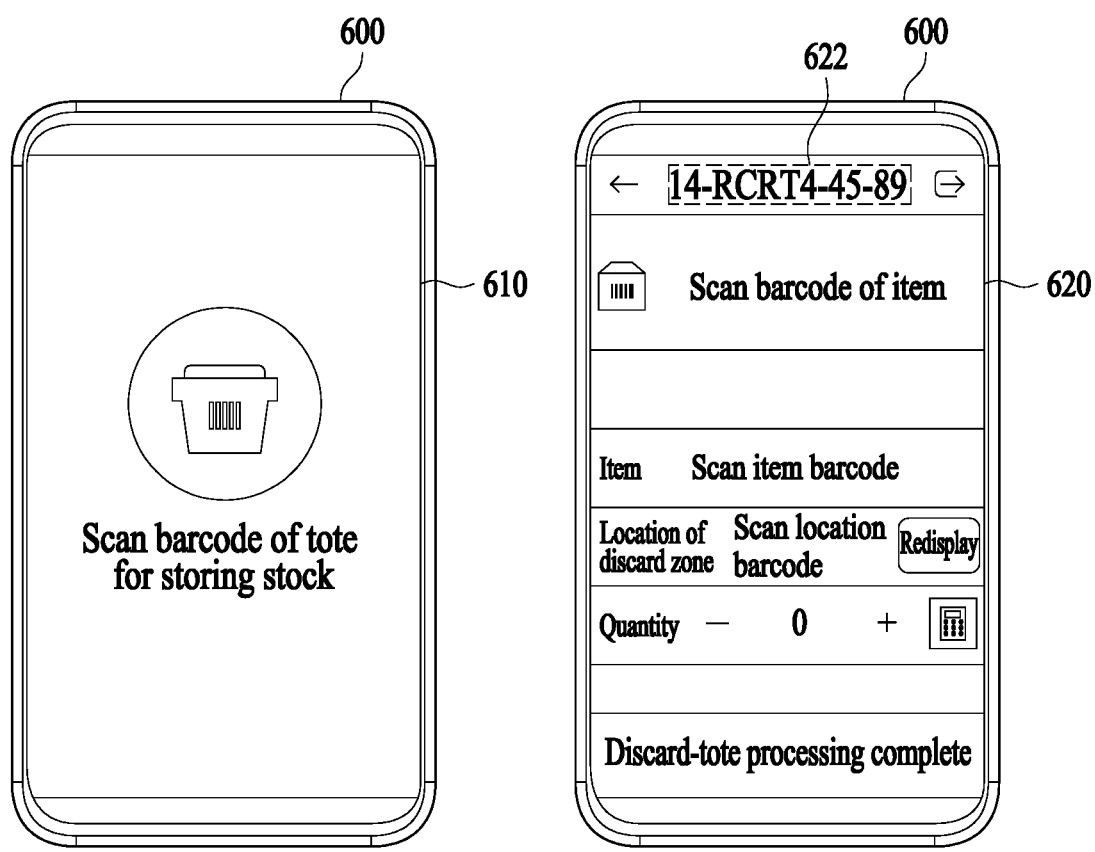
FIG. 6 illustrates an embodiment in which a terminal acquires identification information of an item.

FIG. 6 illustrates an embodiment in which a terminal acquires identification information of an item.

A terminal 600 may display, through a display, an image 610 that requests an operator to scan a tote barcode. The terminal 600 may acquire identification information of a tote by scanning the tote barcode, and may recognize, based on the identification information of the tote, that the tote is a tote for storing an item classified as a disposal target. For example, the terminal 600 may transmit the identification information of the tote to an electronic apparatus, and the electronic apparatus may recognize the identification information of the tote to thereby recognize that the tote is a tote for storing an item classified as a disposal target. Then, the terminal 600 may receive information on or regarding the recognized tote from the electronic apparatus.

When the operator scans the tote barcode using a scanner of the terminal 600, the terminal 600 may include identification information 622 of the tote and may display, through the display, an image 620 requesting the operator to scan a barcode of an item stored in the tote.

As the operator scans the barcode of the item using the terminal 600, the terminal 600 may acquire the identification information of the item.

The terminal 600 may provide the operator with a menu for reporting occurrence of a problem related to scanning an item barcode. By selecting the menu, the operator may input, to the terminal 600, a problem that the barcode of the item is damaged or that the item is not an item stored in the tote. Also, information on the problem input to the terminal 600 may be transmitted to the electronic apparatus.

Referring back to FIG. 5, in operation S504, the terminal 550 may transmit the identification information of the item, which is acquired in operation S502, to the electronic apparatus 500.

In operation S506, the electronic apparatus 500 may recognize the attribute information of the item based on the identification information of the item. Since the description of operation S210 of FIG. 2 is applicable to the description of operation S506, a redundant description will be herein omitted.

In operation S508, the electronic apparatus 500 may recognize the disposal type of the item based on the attribute information of the item. Since the description of operation S220 of FIG. 2 is applicable to the description of operation S508, a redundant description will be herein omitted.

In operation S510, the electronic apparatus 500 may transmit information on or regarding the disposal type of the item, which is recognized in operation S508.

In operation S512, the terminal 550 may acquire processing information for the item, which is involved when the item is processed according to the disposal type of the item.

The terminal 550 may provide the operator with the information on the disposal type of the item and a guide for processing the item according to a disposal type, and may receive the processing information for the item from the operator. For example, the terminal 550 may provide the operator through a Graphical User Interface (GUI) with information on the disposal type of the item and a guide for handling the item according to the disposal type of the item, and may receive the processing information for the item from the operator through the GUI. For example, the terminal 550 may receive the processing information for the item from the operator through a touch screen.

Figure 7:
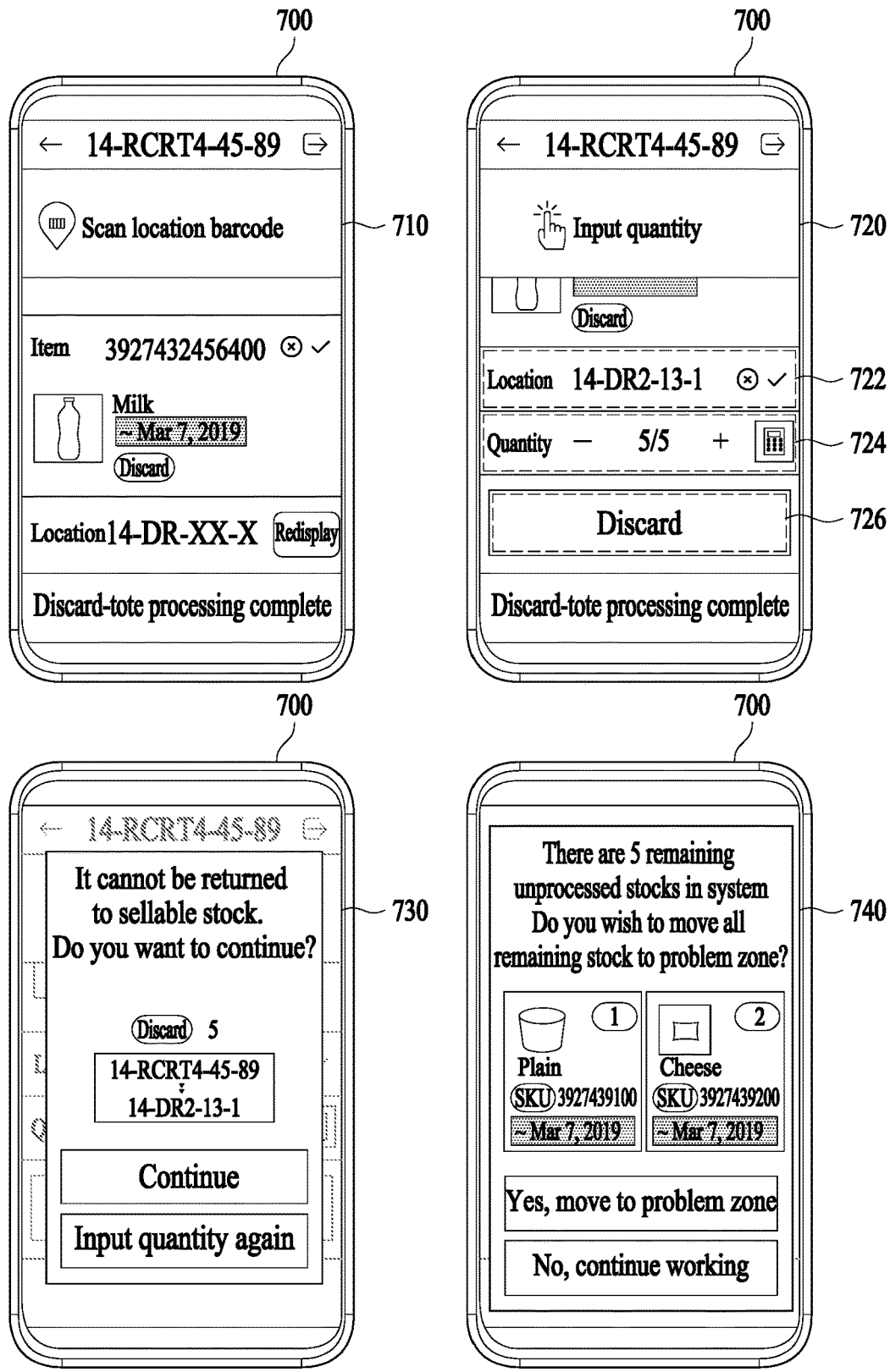
FIG. 7 illustrates a first embodiment in which a terminal acquires processing information for an item.

FIG. 7 illustrates a first embodiment in which a terminal acquires processing information for an item.

A terminal 700 may recognize a disposal type of an item in response to acquiring identification information of the item. For example, in response to acquiring the identification information of the item, the terminal 700 may recognize that the disposal type of the item is discard, and may guide an operator to discard the item.

The terminal 700 may request, from the operator, identification information of a storage unit for storing the item to be discarded. Specifically, the terminal 700 may request scanning a barcode of a second storage unit to which an item pre-stored in a first storage unit is to be transferred for discard. For example, the terminal 700 may display an image 710 that requests scanning a barcode of a storage unit for discard. The operator may use a scanner of the terminal 700 to scan the barcode of the storage unit for discard, and the terminal 700 may acquire identification information of the storage unit as a result of the scanning.

The terminal 700 may provide the operator with a menu for reporting a problem related to scanning of a tote barcode. By selecting the menu, the operator may input, to the terminal 700, a problem that the tote barcode is damaged or that the tote barcode is an invalid barcode. Also, information on the problem input to the terminal 700 may be transmitted to the electronic apparatus.

The terminal 700 may request information on or regarding a quantity of the item to be discarded. Based on the operator's input, the terminal 700 may display identification information 722 of the storage unit for discard and quantity information 724 of the item to be discarded.

The terminal 700 may display an image 730 including discarding information for the item. Specifically, when a discarding instruction is received through a menu 726, the terminal 700 may display the image 730 including information about a storage location change of an item to be discarded and a quantity of the item to be discarded.

The terminal 700 may display an image 740 that includes information on unprocessed stock on a system. For example, when discarding information of an item in a second quantity less than a first quantity among a first quantity of the item classified as a disposal target on the system is input to the terminal 700, the terminal 700 may inquire the operator whether to transfer the item in a quantity corresponding to a difference between the first quantity and the second quantity to a problem zone as unprocessed stock. That is, the terminal 700 may inquire the operator whether to allocate the unprocessed stock as stock of the problem zone.

Figure 8:
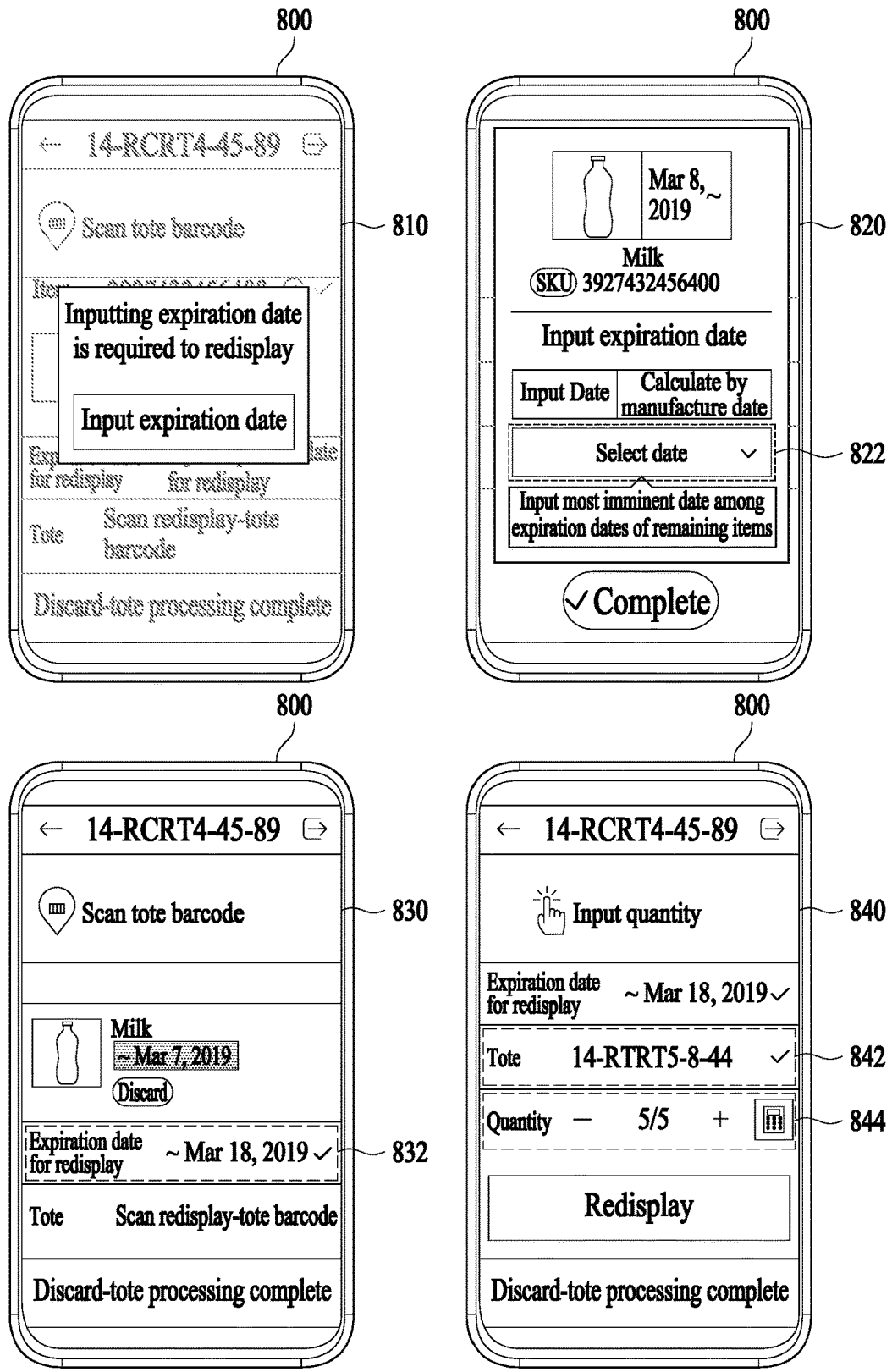
FIG. 8 illustrates a second embodiment in which a terminal acquires processing information for an item.

FIG. 8 illustrates a second embodiment in which a terminal acquires processing information for an item.

A terminal 800 may recognize a disposal type of an item as redisplay. For example, even in the case where the item is recognized as a target to be discarded due to an imminent expiration date, if an operator confirms that the expiration date is actually not imminent, the terminal 800 may recognize the disposal type of the item as redisplay based on the operator's input. For example, the operator may select a redisplay menu shown by the terminal 800.

The terminal 800 may display an image 810 that requests expiration date-related information of the item to be redisplayed.

The terminal 800 may implement a GUI through which the operator is allowed to input the expiration date-related information of the item to be redisplayed. For example, the terminal 800 may implement a touch screen which allows an operator to input expiration date-related information such as an image 820. When a quantity of the item to be redisplayed is two or more, the operator may input the earliest date among expiration dates of items to the terminal 800. For example, the operator may input the earliest date among the expiration dates of the items to the terminal 800 through a date selecting menu 822 in the image 820.

When the expiration date input through the data selecting menu 822 is an incorrect date, the terminal 800 may request re-inputting of an expiration date. For example, when an expiration date input by the operator is identical to or earlier than a previously set expiration date, the terminal 800 may request re-inputting of an expiration date.

The terminal 800 may display, based on the operator's input, an image 830 which includes expiration date-related information 832 of the item to be redisplayed, and may display the image 830 that requests scanning of a barcode of a tote for storing the item to be redisplayed.

The terminal 800 may receive, from the operator, identification information 842 of a tote for redisplay and quantity information 844 of the item to be redisplayed, and may display an image 840 including the identification information 842 and the quantity information 844.

Figure 9:
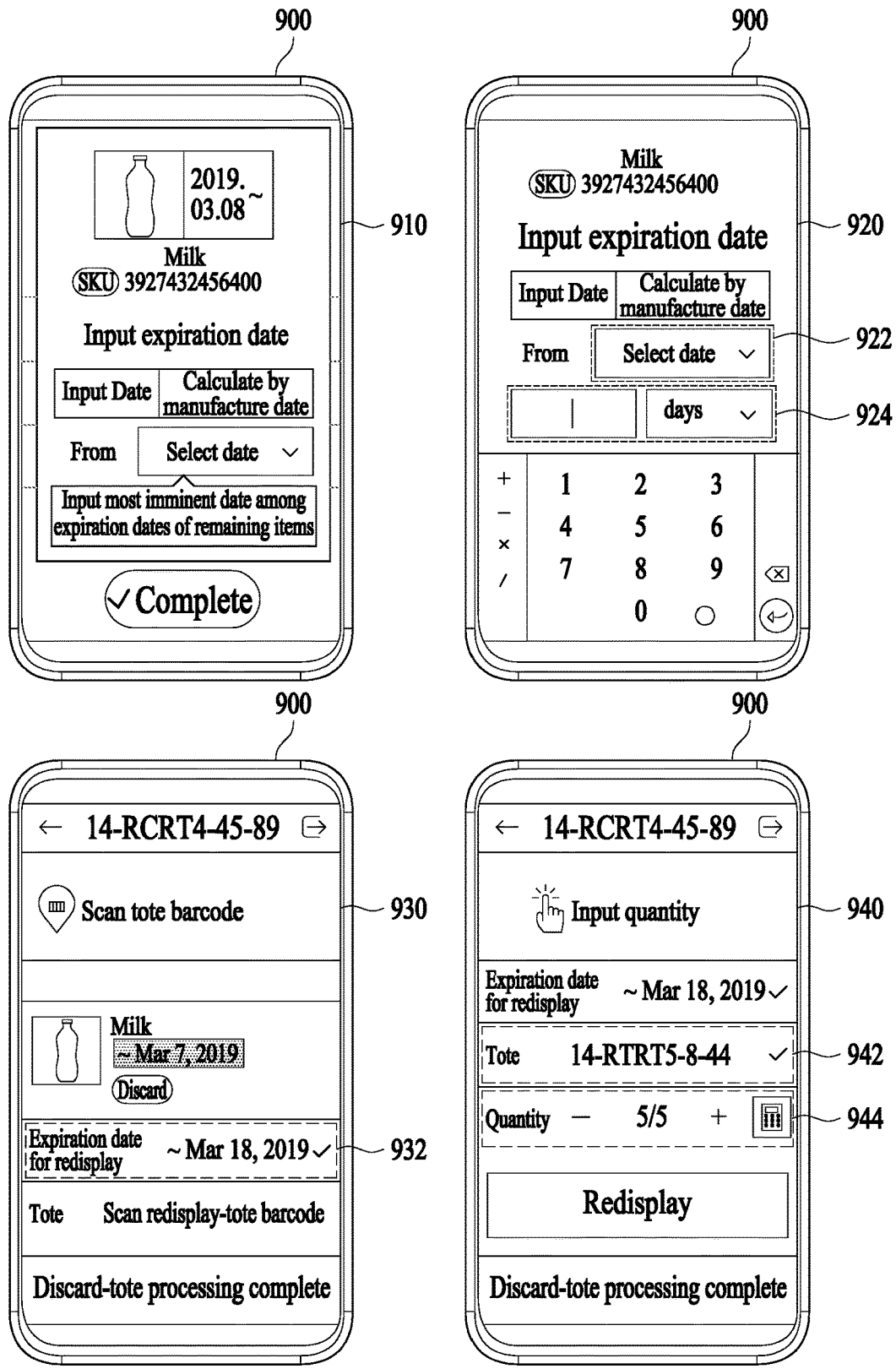
FIG. 9 illustrates a third embodiment in which a terminal acquires processing information for an item.

FIG. 9 illustrates a third embodiment in which a terminal acquires processing information for an item.

A terminal 900 may implement a GUI through which an operator is allowed to input expiration date-related information.

The terminal 900 may display an image 910 that request inputting of expiration date-related information of an item to be redisplayed, and the expiration date-related information may be calculated from a manufacture date of the item. For example, when a quantity of the item is two or more, the operator may input the earliest manufacture date among manufacture dates of items to the terminal 900, and may input information on a predetermined period from the earliest manufacture date to the terminal 900. For example, the operator may input the earliest manufacture date and a recommended consumption period of an item having the earliest manufacture date to the terminal 900 through a manufacture date selecting menu 922 and a period selecting menu 924 in an image 920.

Based on the operator's input, the terminal 900 may display an image 930 which includes expiration date-related information 932 of the item to be redisplayed, and may display the image 930 which requests scanning of a barcode of a tote for storing the item to be redisplayed. The expiration date-related information 932 of the item may be calculated based on the earliest manufacture date and a predetermined period, which are input by the operator to the terminal 900.

The terminal 900 may receive identification information 942 for the tote for redisplay and quantity information 944 of the item to be redisplayed, and may display an image 940 including the identification information 942 and the quantity information 944.

Figure 10:
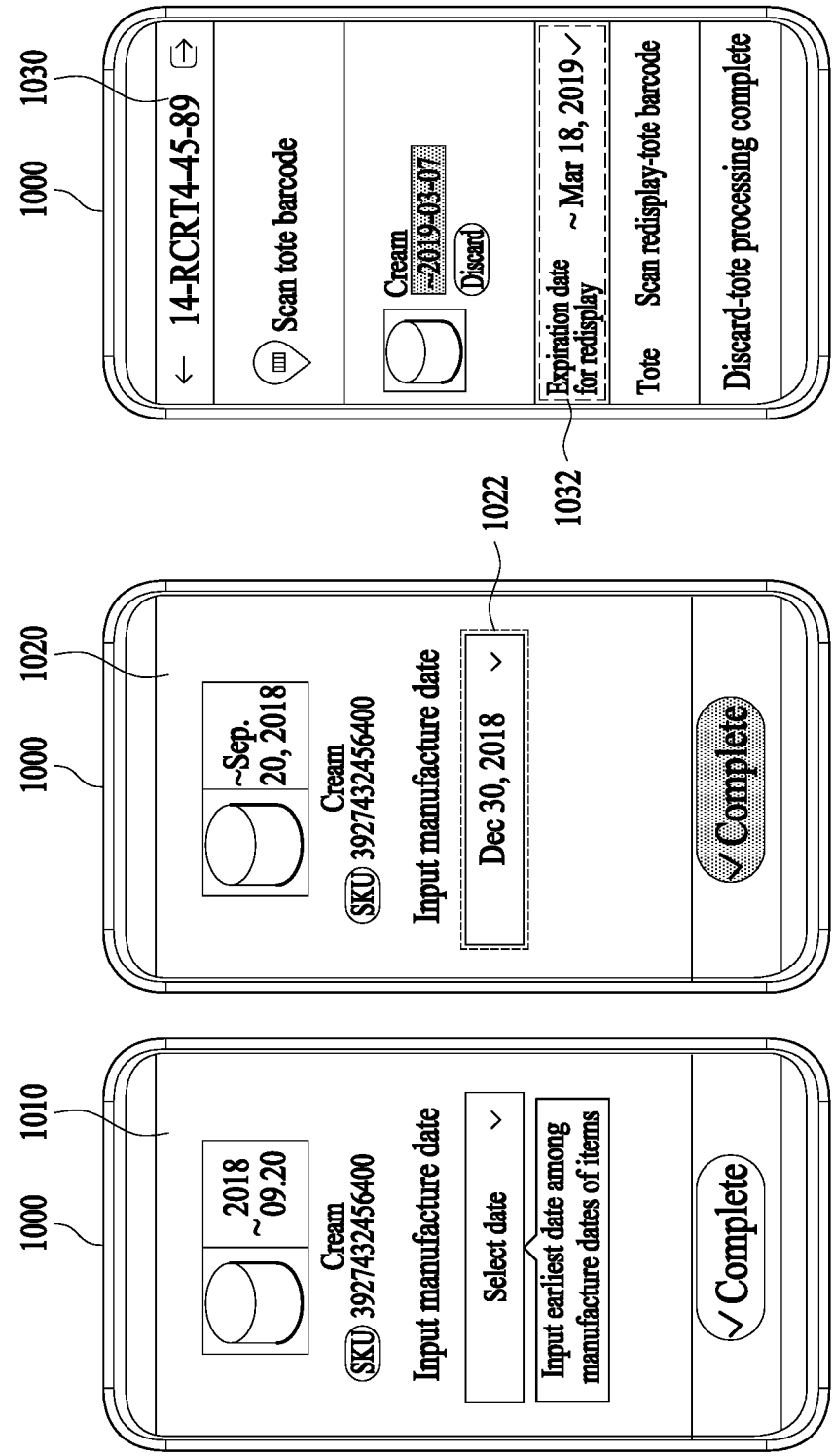
FIG. 10 illustrates a fourth embodiment in which a terminal acquires processing information for an item.

FIG. 10 illustrates a fourth embodiment in which a terminal acquires processing information for an item.

A terminal 1000 may implement a GUI through which an operator is allowed to input expiration date-related information. Specifically, the terminal 1000 may display an image 1010 including a message that requests inputting of information on a manufacture date of an item to be redisplayed. When a quantity of the item is two or more, the operator may input the earliest manufacture date among manufacture dates of items to the terminal 1000. For example, the operator may input information on Dec. 30, 2018, which is the earliest manufacture date, to the terminal 1000 through a manufacturing data selecting menu 1022 in an image 1020.

Based on the operator's input, the terminal 1000 may display an image 1030 which includes expiration date-related information 1032 of the item to be redisplayed, and may display the image 1030 which requests scanning of a barcode of a tote for storing the item to be redisplayed. In addition, the terminal 1000 may receive identification information of a tote for redisplay and quantity information of the item to be redisplayed from the operator, and may display an image including the identification information and the quantity information.

Figure 11:
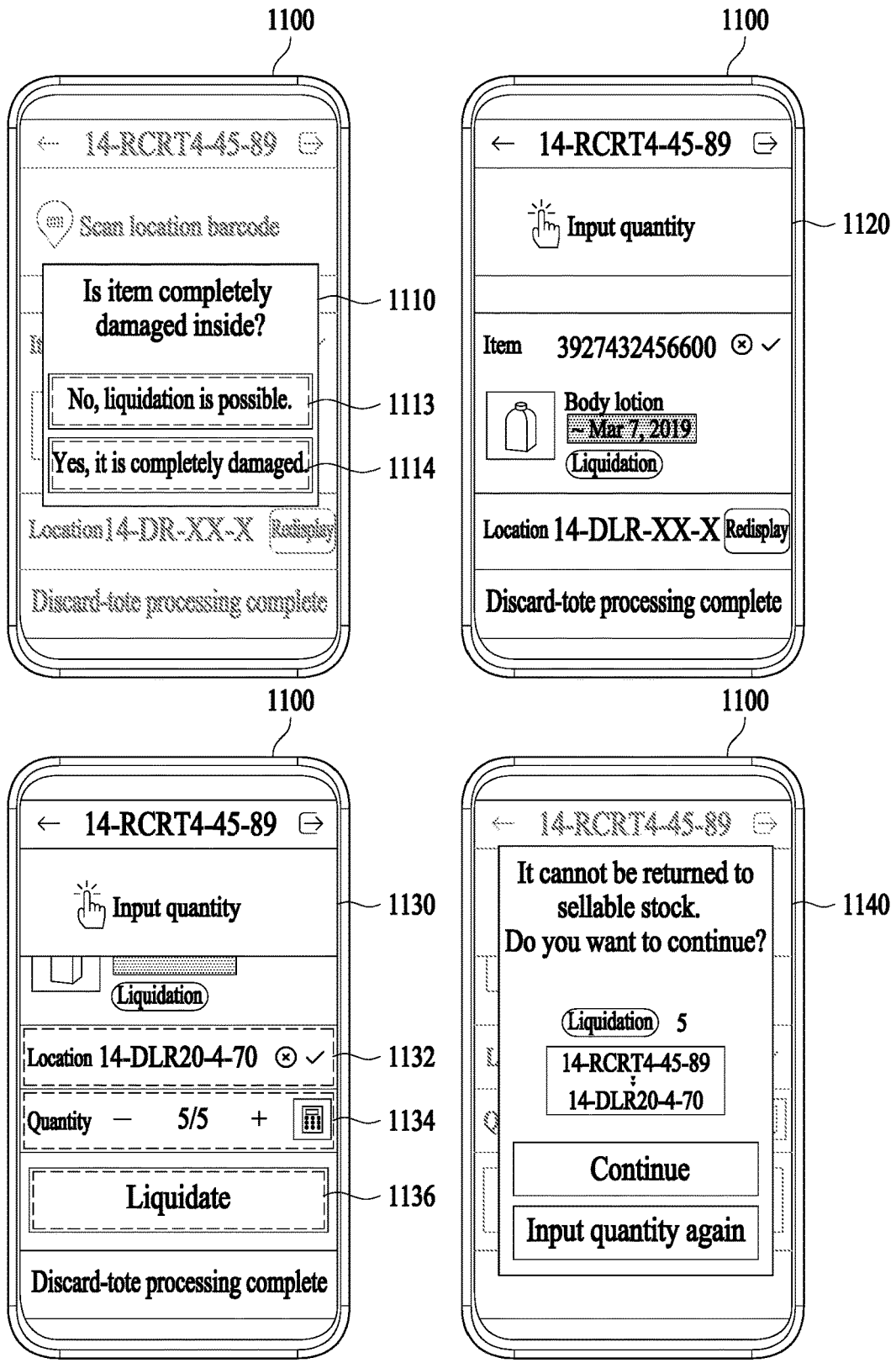
FIG. 11 illustrates a fifth embodiment in which a terminal acquires processing information for an item.

FIG. 11 illustrates a fifth embodiment in which a terminal acquires processing information for an item.

A terminal 1100 may recognize a disposal type of an item based on an operator's input. For example, the terminal 1100 may display a menu 1110 for selecting a degree of damage to the item. When the operator selects a first menu 1113 from the menu 1110, the terminal 1100 may recognize the disposal type of the item as liquidation, and when the operator selects a second menu 1114 from the menu 1110, the terminal 1100 may recognize the disposal type of the item as discard.

When the disposal type of the item is recognized as liquidation, the terminal 1100 may request, from the operator, identification information of a storage unit for storing the item to be liquidated. For example, the terminal 1100 may display an image 1120 that requests scanning of a barcode of the storage unit for liquidation.

The terminal 1100 may request quantity information of the item to be liquidated. Based on the operator's input, the terminal 1100 may display an image 1130 which includes identification information 1132 of the storage unit for liquidation and quantity information 1134 of the item to be liquidated.

The terminal 1100 may display an image 1140 including liquidation information of the item. Specifically, when a liquidation instruction is received through a menu 1136, the terminal 1100 may display the image 1140 which includes information on a location change of an item to be liquidated and quantity information of the item to be liquidated.

Figure 12:
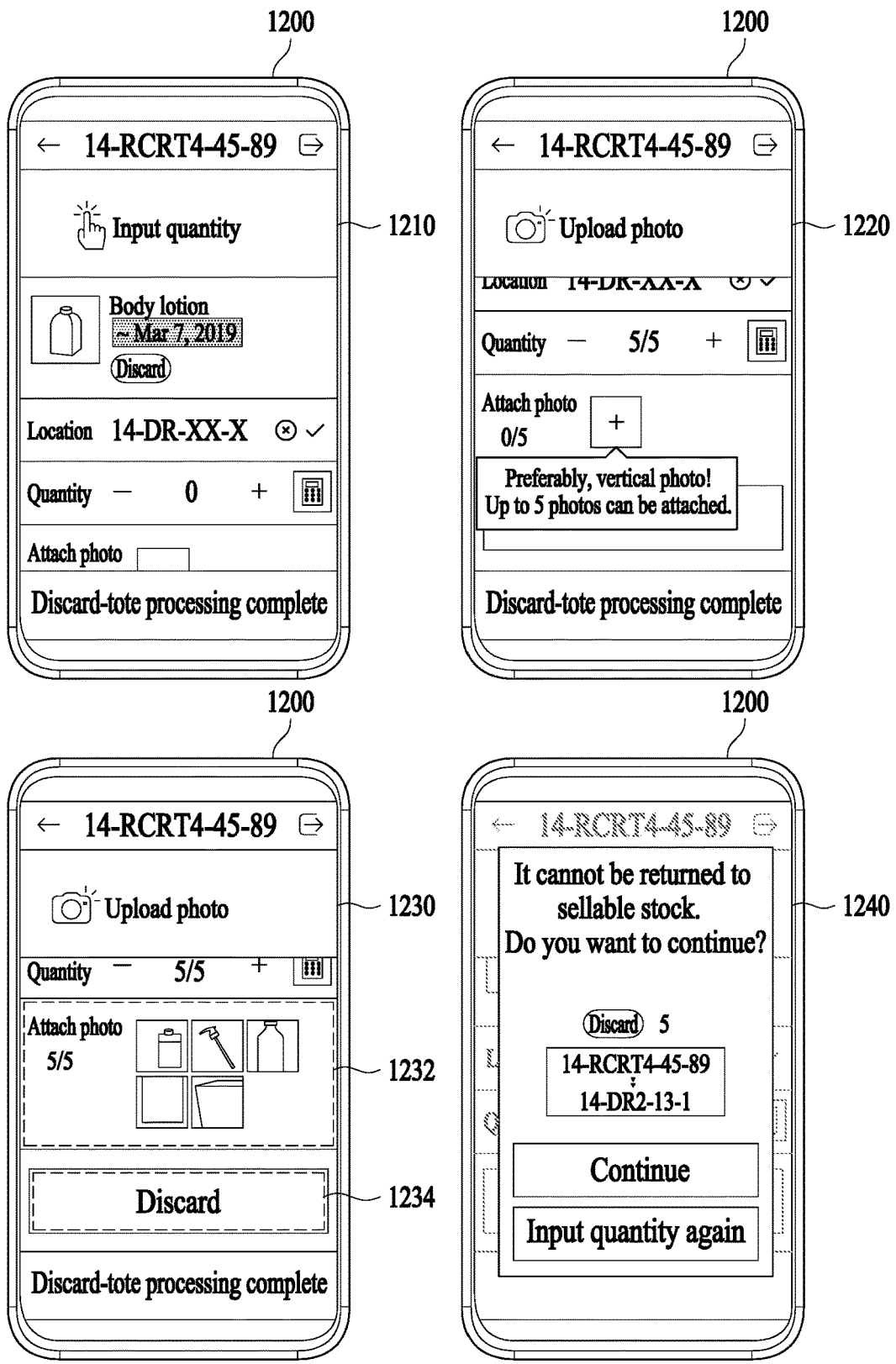
FIG. 12 illustrates a sixth embodiment in which a terminal acquires processing information for an item.

FIG. 12 illustrates a sixth embodiment in which a terminal acquires processing information for an item.

A terminal 1200 may recognize a disposal type of an item as discard based on damage-related information of the item, and may guide an operator to discard the item.

The terminal 1200 may display an image 1210 that requests information on a location of a storage unit for discard and quantity information of the item to be discarded.

The terminal 1200 may display an image 1220 that requests image information of the item to be discarded. Specifically, when the operator discards the item due to damage, the operator may input image information of the item to the terminal 1200. For example, the operator may input the image information the item to be discarded to the terminal 1200 through a camera of the terminal 1200. When the item to be discarded is in plural, the operator may input image information of each item to the terminal 1200. Since the terminal 1200 is capable of acquiring image information of the item to be discarded, it is possible to prevent that the operator takes the item to be discarded for any illegal purpose.

Based on the operator's input, the terminal 1200 may display an image 1230 including image information 1232 of the item to be discarded.

The terminal 1200 may display an image 1240 including discarding information of the item. Specifically, when a discarding instruction is received through a menu 1234, the terminal 1200 may display the image 1240 which includes a location change of the item to be discarded and the quantity information of the item to be discarded.

Referring back to FIG. 5, the terminal 550 may transmit the processing information for the item, which is acquired in operation S512, to the electronic apparatus 500 in operation S514.

In operation S516, the electronic apparatus 500 may update the information on the stock based on the processing information for the item, which is received from the terminal 550. Since the description of S240 of FIG. 2 is applicable to the description of operation S516, a redundant description will be herein omitted.

FIG. 5 illustrates that operations S502 to S516 are performed by the electronic apparatus 500 and the terminal 550, according to an embodiment, but the present disclosure is not limited thereto. For example, operations S502 to S516 may be performed by the electronic apparatus 500, or operations S502 to S516 may be performed by the terminal 550.

FIG. 13 illustrates an embodiment in which an electronic apparatus displays information regarding stock.

An electronic apparatus 100 may display information 1300 on stock through a display. The information 1300 on the stock may be updated based on processing information for an item.

The information 1300 on the stock may include identification information 1302 of each of totes for storing an item classified as a disposal target. For example, the totes may be divided into a tote including an item classified as a disposal target due to an imminent expiration date, a tote including an item classified as a disposal target due to damage, and the like.

The information 1300 on the stock may include quantity information 1304 of items included in the respective totes. For example, a tote with a tote barcode "14-RCRT0-9-4" may include an item in quantity of 1.

The information 1300 on the stock may include identification information 1306 regarding an operator who processes an item according to a disposal type of the item. For example, the identification information regarding the operator may include identification information of a terminal carried by the operator.

The information 1300 on the stock may include: quantity information 1308 of an item transferred to a tote for discard among a total quantity of the item in each tote; quantity information 1312 of an item transferred to a tote for redisplay among the total quantity of the item in each tote; and quantity information 1310 of an item assigned to a problem zone due to unprocessed stock on a system. The quantity information 1308, 1310, and 1312 of the items may be updated based on the processing information for the respective items.

The information 1300 on the stock may include information 1314 on a time at which each item is processed according to a disposal type of a corresponding item.

Figure 14:
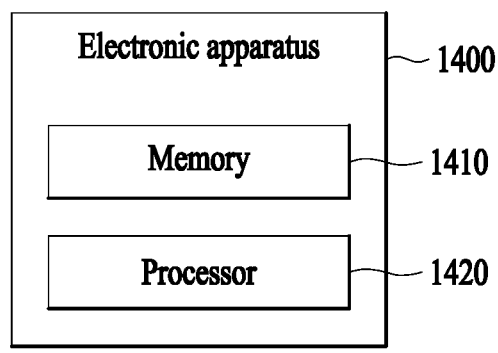
FIG. 14 illustrates a block diagram of an electronic apparatus.

FIG. 14 illustrates a block diagram of an electronic apparatus.

An electronic apparatus 1400 may include a memory 1410 and a processor 1420. The electronic apparatus 1400 illustrated in FIG. 14 shows components related to the present embodiment. Accordingly, it would be understood by one of ordinary skill in the art that general-purpose components other than the components shown in FIG. 14 may be further included. Since the description of the electronic apparatuses 100 and 500 is applicable to the description of the electronic apparatus 1400, a redundant description will be herein omitted.

The memory 1410 is hardware storing various types of data processed in the electronic apparatus 1400, and the memory 1410 may store, for example, data processed or to be processed in the electronic apparatus 1400. The memory 1410 may store at least one instruction for operating the processor 1420. In addition, the memory 1410 may store programs or applications to be executed by the electronic apparatus 1400. The memory 1410 may include random access memory (RAM) such as dynamic random access memory (DRAM) and static random access memory (SRAM), read-only memory (ROM), electrically erasable programmable read-only memory (EEPROM), CD-ROM, Blu-ray or other optical disc storage, hard disk drive (HDD), solid state drive (SSD), and flash memory.

The processor 1420 may control overall operations of the electronic apparatus 1400 and process data and signals. The processor 1420 may overall control the electronic apparatus 1400 by executing at least one instruction or at least one program stored in the memory 1410. The processor 1420 may be implemented as a central processing unit (CPU), a graphics processing unit (GPU), or an application processor (AP), but not limited thereto.

The processor 1420 may recognize attribute information of an item classified as a disposal target. The processor 1420 may recognize the attribute information of the item based on identification information of the item. According to an embodiment, the processor 1420 may receive the identification information of the item from an external terminal through a communication device of the electronic apparatus 1400, and may recognize the attribute information of the item based on the identification information.

The processor 1420 may recognize a disposal type of the item based on the attribute information of the item.

The processor 1420 may recognize the item as a target to be liquidated based on freshness-related information of the item. The processor 1420 may recognize the item as a target to be discarded based on management type information and expiration date-related information of the item. The processor 1420 may recognize the item as a target to be repacked based on damage-related information of the item. The processor 1420 may recognize the item as a target of self-consumption based on the attribute information of the item. The processor 1420 may recognize the item as a target to be redisplayed based on the attribute information of the item. The processor 1420 may recognize a disposal type of the item based on a user's input.

The processor 1420 may acquire processing information for the item, which is involved when the item is processed according to the disposal type of the item.

According to an embodiment, the processor 1420 may transmit information regarding the disposal type of the item to the terminal through a communication device of the electronic apparatus 1400, and acquire processing information for the item from the terminal. According to another embodiment, the processor 1420 may acquire the processing information for the item through an input device of the electronic apparatus 1400.

When recognizing the disposal type of the item as discard, the processor 1420 may acquire information on or regarding a quantity of an item to be transferred to a second storage unit for discard among a total quantity of the item stored in a first storage unit, and identification information of the second storage unit.

When recognizing the disposal type of the item as redisplay, the processor 1420 may acquire information on a quantity of an item to be transferred to a second storage unit for redisplay among a total quantity of the item stored in the first storage unit, and identification information of the second storage unit. In addition, the processor 1420 may further acquire expiration date-related information on a quantity of an item to be transferred from a first storage unit to a second storage unit.

When recognizing the disposal type of the item as repacking, the processor 1420 may acquire information on a quantity of an item to be transferred to a second storage unit for repacking among a total quantity of item stored in a first storage unit, and identification information of the second storage unit.

When recognizing the disposal type of the item as self-consumption, the processor 1420 may acquire information on a quantity of an item to be transferred to a second storage unit for self-consumption among a total quantity of the item stored in a first storage unit, and identification information of the second storage unit.

When recognizing the disposal type of the item as liquidation, the processor 1420 may acquire information on a quantity of an item to be a second storage unit for liquidation among a total quantity of the item stored in a first storage unit, and identification information of the second storage unit.

The processor 1420 may update information on stock based on the processing information for the item.

The processor 1420 may provide the processing information for the item. For example, the processor 1420 may display the processing information for the item through a display.

Figure 15:
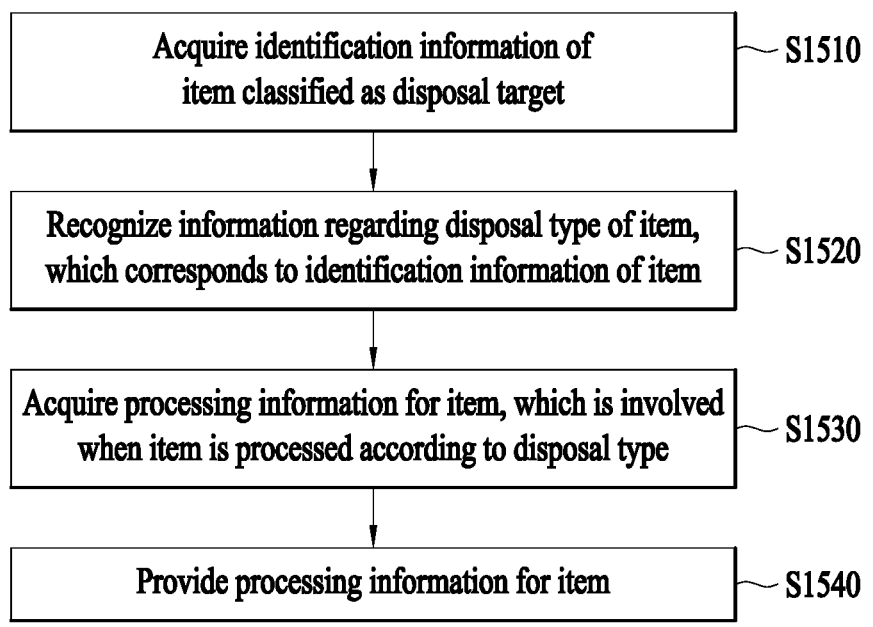
FIG. 15 illustrates an embodiment of a method in which a terminal operates.

FIG. 15 illustrates an embodiment of a method in which a terminal operates.

In operation S1510, a terminal 200 may acquire identification information of an item classified as a disposal target. For example, since the terminal 200 may include an image sensor, it is possible to acquire the identification information of the item through an image sensor of the terminal 200. In addition, since the terminal 200 may include a controller, the controller of the terminal 200 may acquire the identification information of the item by controlling the image sensor.

In operation S1520, the terminal 200 may recognize information on a disposal type of the item, which corresponds to the identification information of the item. Since the terminal 200 may include a communication device, the identification information of the item may be transmitted to an external electronic apparatus through the communication device, and the information on the disposal type of the item corresponding to the identification information of the item may be acquired from the external electronic apparatus. In addition, since the terminal 200 may include a controller, the controller of the terminal 200 may control the communication device to acquire information on the disposal type of the item.

In operation S1530, the terminal 200 may acquire processing information for the item, which is involved when the item is processed according to the disposal type. Since the terminal 200 may include an input device, it is possible to acquire the processing information for the item through the input device. In addition, since the terminal 200 may include a controller, the controller of the terminal 200 may control the input device to acquire the processing information for the item.

In operation S1540, the terminal 200 may provide the processing information for the item. According to an embodiment, since the terminal 200 may include a display, it is possible to display the processing information for the item through the display. According to another embodiment, the terminal 200 may include a communication device, and may transmit the processing information for the item to an external electronic apparatus through the communication device. In addition, since the terminal 200 may include a controller, the controller of the terminal 200 may control the display or the communication device to provide the processing information for the item.

The electronic device or the terminal in accordance with the above-described embodiments may include a processor, a memory which stores and executes program data, a permanent storage such as a disk drive, a communication port for communication with an external device, and a user interface device such as a touch panel, a key, and a button. Methods realized by software modules or algorithms may be stored in a computer-readable recording medium as computer-readable codes or program commands which may be executed by the processor. Here, the computer-readable recording medium may be a magnetic storage medium (for example, a read-only memory (ROM), a random-access memory (RAM), a floppy disk, or a hard disk) or an optical reading medium (for example, a CD-ROM or a digital versatile disc (DVD)). The computer-readable recording medium may be dispersed to computer systems connected by a network so that computer-readable codes may be stored and executed in a dispersion manner. The medium may be read by a computer, may be stored in a memory, and may be executed by the processor.

The present embodiments may be represented by functional blocks and various processing steps. These functional blocks may be implemented by various numbers of hardware and/or software configurations that execute specific functions. For example, the present embodiments may adopt direct circuit configurations such as a memory, a processor, a logic circuit, and a look-up table that may execute various functions by control of one or more microprocessors or other control devices. Similarly to that elements may be executed by software programming or software elements, the present embodiments may be implemented by programming or scripting languages such as C, C++, Java, and assembler including various algorithms implemented by combinations of data structures, processes, routines, or of other programming configurations. Functional aspects may be implemented by algorithms executed by one or more processors. In addition, the present embodiments may adopt the related art for electronic environment setting, signal processing, and/or data processing, for example. The terms "mechanism", "element", "means", and "configuration" may be widely used and are not limited to mechanical and physical components. These terms may include meaning of a series of routines of software in association with a processor, for example.

The above-described embodiments are merely examples and other embodiments may be implemented within the scope of the following claims.

What is claimed is:

1. A method operable by an electronic apparatus for stock management, the method comprising:
    obtaining, by the electronic apparatus from a mobile terminal, item information of an item;
    identifying, by the electronic apparatus, attribute information of the item from the item information of the item;
    determining, by the electronic apparatus, based on the attribute information of the item, that the item comprises a disposal target;
    identifying, by the electronic apparatus, a disposal type of the item from a plurality of disposal types based on the attribute information of the item, wherein the disposal type of the item identifies a manner of disposal for the item;
    transmitting, from the electronic apparatus to the mobile terminal, instructions for processing the item based on the manner of disposal for the item, wherein the instructions for processing the item identify a quantity of the item for disposal and the manner of disposal for the quantity of the item, and wherein the instructions for processing the item are displayed via a user interface of the mobile terminal;
    acquiring, by the electronic apparatus, via the user interface of the mobile terminal, processing information of the item, wherein the processing information of the item identifies a disposal status of the item; and
    updating, by the electronic apparatus, the item information of the item based on the processing information of the item.

2. The method of claim 1, wherein the attribute information of the item comprises at least one of: management type information of the item, expiration date-related information of the item, freshness-related information of the item, or damage-related information of the item.

3. The method of claim 1, wherein the manner of disposal for the item identified by the disposal type of the item comprises at least one of liquidation, discard, redisplay, repacking, or self-consumption.

4. The method of claim 1,
    wherein the disposal type of the item comprises a liquidation disposal type, wherein identifying the disposal type of the item is based on determining management of the item is based on a freshness,
    wherein the instructions for processing for the item further identifies the quantity of the item, from a total quantity of the item stored in a first storage unit, to be transferred to a second storage unit for liquidation of the quantity of the item, and identification information of the second storage unit.

5. The method of claim 1,
    wherein the disposal type of the item comprises a discard disposal type, wherein identifying the disposal type of the item is based on determining management of the item is based on an expiration date and the expiration date is within a predetermined period from a current date,
wherein the instructions for processing the item further identifies the quantity of the item, from a total quantity of the item stored in a first storage unit, to be transferred to a second storage unit for discard of the quantity of the item, and identification information of the second storage unit.

6. The method of claim 1,
wherein the disposal type of the item comprises a discard disposal type, wherein identifying the disposal type of the item is based on determining management of the item is based on a manufacture date and the item corresponds to a preset type of item,
wherein the instructions for processing the item further identifies the quantity of the item, from a total quantity of the item stored in a first storage unit, to be transferred to a second storage unit for discard of the quantity of the item, and identification information of the second storage unit.

7. The method of claim 1,
wherein the disposal type of the item comprises a discard disposal type based on damage-related information of the item,
wherein the instructions for processing the item further identifies the quantity of the item, from a total quantity of the item stored in a first storage unit, to be transferred to a second storage unit for discard of the quantity of the item, image information of the quantity of the item to be transferred to the second storage unit, and identification information of the first storage unit or the second storage unit.

8. The method of claim 1,
wherein the disposal type of the item comprises a repacking disposal type based on damage-related information of the item,
wherein the instructions for processing the item further identifies the quantity of the item, from a total quantity of the item stored in a first storage unit, to be transferred to a second storage unit for repacking of the quantity of the item, and identification information of the second storage unit.

9. The method of claim 1, wherein the identifying of the disposal type of the item comprises identifying the disposal type of the item based on an input of an operator.

10. The method of claim 9,
wherein the disposal type of the item comprises a redisplay disposal type,
wherein the instructions for processing the item further identifies the quantity of the item, from a total quantity of the item stored in a first storage unit, to be transferred to a second storage unit for redisplay of the quantity of the item, expiration date-related information for the quantity of the item to be transferred to the second storage unit, and identification information of the second storage unit.

11. The method of claim 1,
wherein the acquiring of the processing information of the item comprises transmitting information regarding the disposal type of the item to the mobile terminal and receiving processing information of the item from the mobile terminal,
wherein the mobile terminal is configured to provide the information regarding the disposal type of the item to an operator and receive the processing information of the item from the operator through the user interface of the mobile terminal.

12. A non-transitory computer-readable medium having stored thereon a program which, when executed by a computer, implements the method of claim 1.

13. An electronic apparatus for stock management, the apparatus comprising:
a memory configured to store at least one instruction; and
a processor configured to execute the at least one instruction to perform the following operations:
obtaining, by the electronic apparatus from a mobile terminal, item information of an item;
identifying, by the electronic apparatus, attribute information of the item from the item information of the item;
determining, by the electronic apparatus, based on the attribute information of the item, that the item comprises a disposal target;
identifying, by the electronic apparatus, a disposal type of the item from a plurality of disposal types based on the attribute information of the item, wherein the disposal type of the item identifies a manner of disposal for the item;
transmitting, from the electronic apparatus to the mobile terminal, instructions for processing the item based on the manner of disposal for the item, wherein the instructions for processing the item identify a quantity of the item for disposal and the manner of disposal for the quantity of the item, and wherein the instructions for processing the item are displayed via a user interface of the mobile terminal;
acquiring, by the electronic apparatus, via the user interface of the mobile terminal, processing information of the item, wherein the processing information of the item identifies a disposal status of the item; and
updating, by the electronic apparatus, the item information of the item based on the processing information of the item.

* * * * *